UNITED STATES PATENT OFFICE.

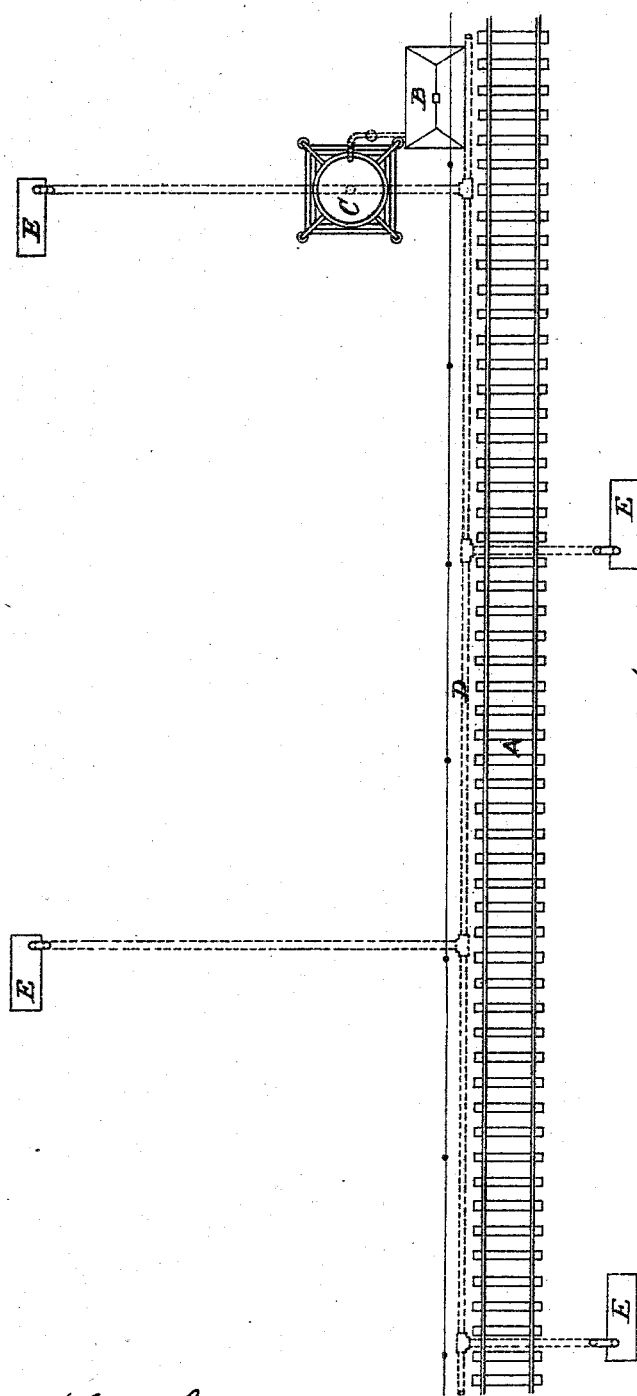

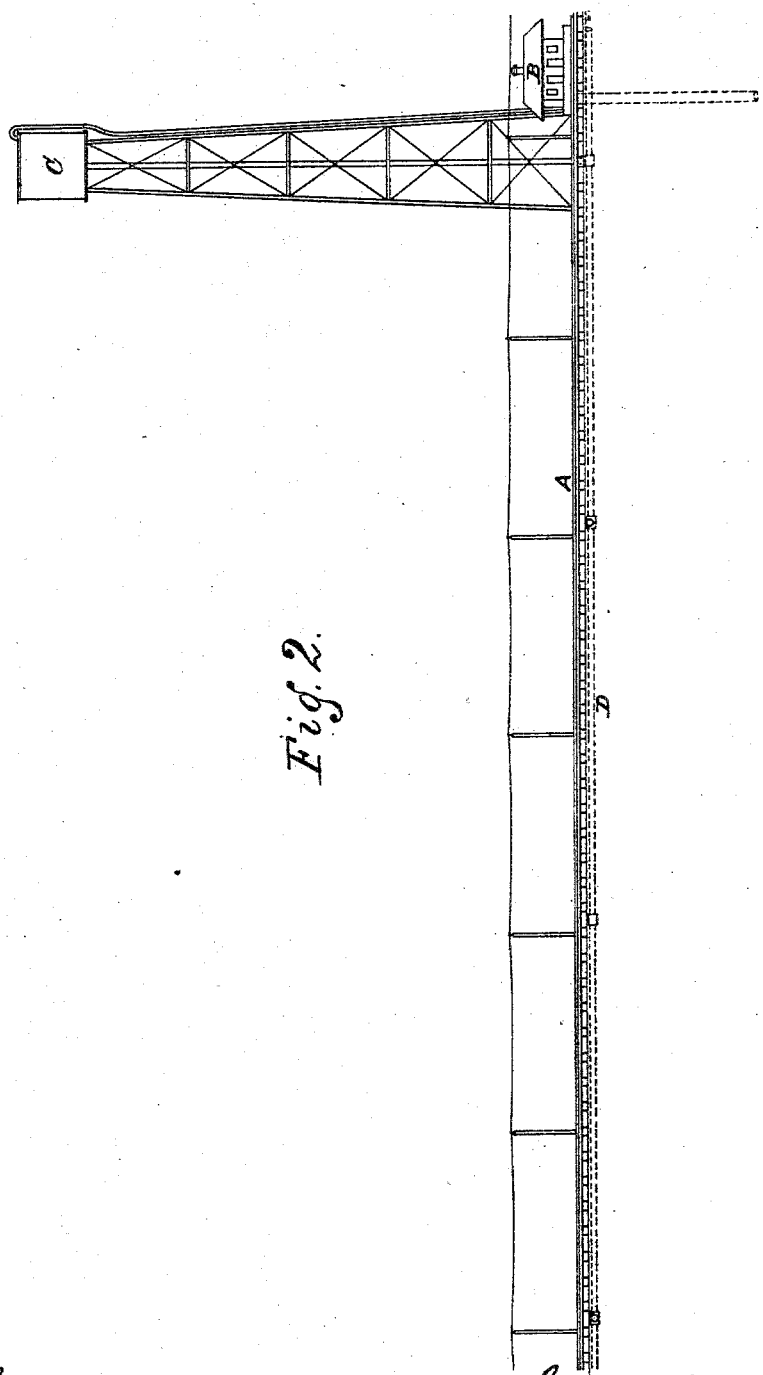

CHARLES P. SYKES, OF CALABASAS, ARIZONA TERRITORY.

COMBINED RAILWAY AND CATTLE WATER-SUPPLY.

SPECIFICATION forming part of Letters Patent No. 289,040, dated November 27, 1883.

Application filed October 31, 1883. (No model.)

*To all whom it may concern:*

Be it known that I, CHARLES P. SYKES, a citizen of the United States, and a resident of Calabasas, in the county of Pima and Territory of Arizona, have invented a new and useful Improvement in Combined Railway and Cattle Water-Supply, of which the following is a specification.

It is well known that in many of the southwestern portions of this country there are many places adapted by reason of the immense growth of herbage to grazing purposes; but the want of a supply of water for cattle has heretofore rendered these lands practically valueless.

My invention has for its object the utilization of these regions for grazing purposes by connecting with the railway system at stations where water is pumped from wells for other purposes a system of water-supply for cattle. It is especially adapted to the dry grass lands of Arizona and New Mexico, but may be made available in other localities where similar conditions exist.

In the Territories above referred to the rain-fall is irregular, and is almost immediately absorbed, owing to the character of the soil, so that while the gramma and other grasses are grown in great abundance and are of great value for cattle, water is only obtained by digging wells some distance below the surface, and the use of pumping machinery. An independent system of water-supply for this purpose alone is expensive, and, for other reasons, to a great extent impracticable. By connecting a series of watering-stations with the pumping-stations of the railways passing through these districts, a large area of grazing-lands may be watered at comparatively small expense for first cost and subsequent maintenance.

In availing myself of the pumping-stations and line of railway already established it is only necessary to lay a line of water-mains along the line of the road communicating with the nearest source of water-supply for locomotives, and connect at the most desirable points with troughs or tanks so arranged as to levels that the overflow from the first tank or trough will pass in succession to others in proportion to the area to be watered, or the quantity of the water-supply. In this way, if necessary, only the surplus water not required for locomotive purposes need be used; and a system of signals connecting with devices for arresting the flow of water at any required point can readily be devised, by which waste may be prevented.

In the drawings, Figure 1 represents a plan view, and Fig. 2 a vertical section, of the various parts involved in my invention.

Similar letters of reference indicate like parts in all the figures.

A represents a line of railway; B, the station; C, the elevated tank communicating with a pump and well, and supplying the pipe-line D, which is connected by branch pipes F to the tanks E. The pipe-line may be laid between the rails, or at the side of the track, advantage being taken of the grading of the road-bed for economy and convenience in laying the pipe, which may be laid at any proper depth below the surface. It will be readily understood that only the most elementary form of this system can be shown in a drawing for the Patent Office. A variety of modifications in its practical application will undoubtedly be required from a variety of causes. The nature and topography of the region to be watered will be fully understood by the engineer before commencing work. The position and distances of the watering troughs or tanks from the main line may be varied to a great extent without departing from the essential features of my invention.

I propose, in situations where the grade of the surrounding country will allow it to be done, to supply the nearest tank from the main line of pipe, and then, taking the overflow from this tank, fill a number of tanks, one after the other, by gravity, until the lowest level of the grade is reached.

Having thus described the nature of my invention, what I claim as new, and desire to secure by Letters Patent, is—

1. In supplying water to cattle, the combination, with railroad watering-tanks, of pipes adapted to convey the surplus water of said tanks to various points on the road, and drinking-tanks suitably connected to said pipe-line, substantially as and for the purpose set forth.

2. In a water-supply system for cattle, the pumping-stations, combined with the pipe-line D, branch pipes F, and drinking troughs or tanks E, substantially as set forth.

In testimony that I claim the foregoing as my invention I have signed my name, in presence of two witnesses, this 22d day of October, 1883.

CHARLES P. SYKES.

Witnesses:
JOHN VAN NEST,
HOWARD MATHER.